United States Patent

Schwert et al.

[11] Patent Number: 6,032,698
[45] Date of Patent: Mar. 7, 2000

[54] METHOD AND AN APPARATUS FOR LINING A PIPE OR DUCT

[75] Inventors: Siegfried Schwert; Wolf Rabold; Uwe Fischer, all of Berlin, Germany

[73] Assignee: Karl Weiss hoch-tief- und Rohrleitungsbau GmbH & Co., Germany

[21] Appl. No.: 09/152,025

[22] Filed: Sep. 11, 1998

[51] Int. Cl.⁷ .............................. F16L 55/18; B29C 63/28
[52] U.S. Cl. ................................................. 138/98; 138/97
[58] Field of Search ........................... 156/287; 428/421; 526/282; 220/82 R; 425/62; 138/98, 97; 264/511, 102, 95

[56] References Cited

U.S. PATENT DOCUMENTS

| | | | |
|---|---|---|---|
| 4,064,211 | 12/1977 | Wood | 264/95 |
| 4,215,178 | 7/1980 | Martin, Jr. | 428/421 |
| 4,368,091 | 1/1983 | Ontsuga et al. | 156/287 |
| 4,376,490 | 3/1983 | Mizusaki | 220/82 R |
| 4,386,628 | 6/1983 | Stanley | 138/97 |
| 4,942,013 | 7/1990 | Palmer et al. | 264/511 |
| 4,997,606 | 3/1991 | Mears et al. | 264/102 |
| 5,439,033 | 8/1995 | Kamiyama et al. | 138/98 |
| 5,525,049 | 6/1996 | Paletta | 425/62 |
| 5,612,434 | 3/1997 | Epple et al. | 526/282 |

*Primary Examiner*—Andres Kashnikow
*Assistant Examiner*—Davis Hwu
*Attorney, Agent, or Firm*—Locke Reynolds LLP

[57] ABSTRACT

The invention relates to a method and an apparatus for lining a pipe through a sealing internal lining by using a flexible tube including adhesive, which is introduced into said pipe in turning inside out manner and is kept dimensionally stable until the adhesive is cured. To reduce the frictional force during the introducing operation a strip additive is deposited onto the outside of the flexible tube prior to the turning up operation. A strip additive having a gel-like consistence is used to minimize the frictional force. For a uniformly wetting the flexible tube with the strip additive, this is transferred into a liquid condition by heating prior to depositing. After depositing, it quickly cools down to the ambient temperature such that the required gel-like consistence is ensured for the introducing operation. Thereby it is possible to line pipes or ducts comprising several pipe bends an angles within the line course.

15 Claims, 4 Drawing Sheets

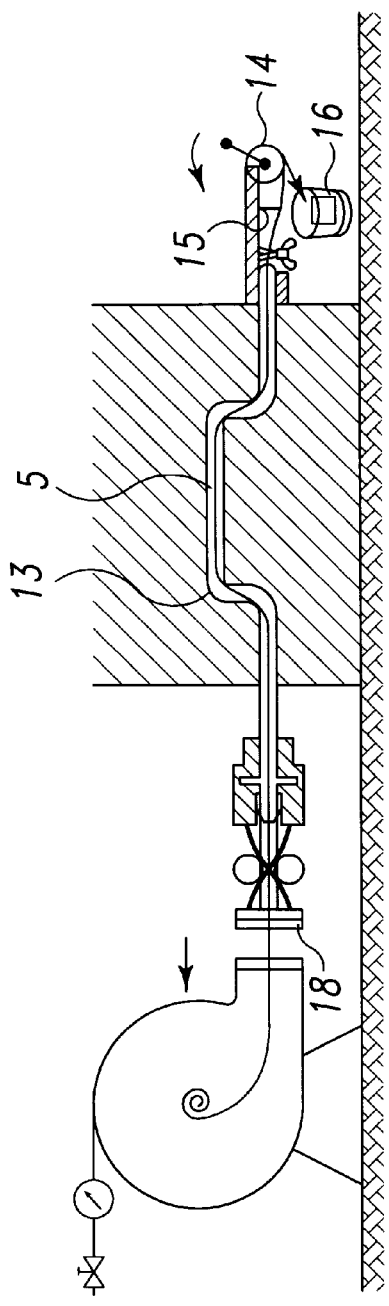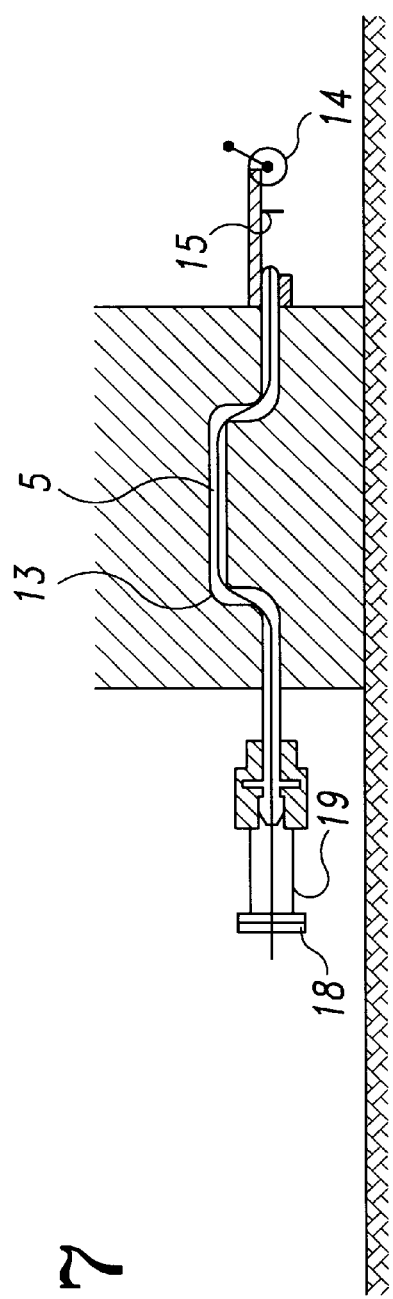

METHOD AND AN APPARATUS FOR LINING A PIPE OR DUCT

The present invention relates to a method for lining a pipe or a duct through a sealing internal lining with a plastic coated flexible tube as well as an apparatus for performing this method.

A method for lining the inner surface of a pipe with a flexible tubular lining material by using a liquid resin serving as an adhesive is described in the U.S. Pat. No. 4,368,091. This method comprises the following steps:

a) annularly fixing one end of a lining material, which includes a liquid resin in the interior thereof, to one end of the pipe line b) applying a pressure with the aid of a pressure medium on said lining material such that said material is turned inside out at a turning point being formed past the fixing position such that said lining material moves into said pipe line and the turning point advances within the pipe line in the moving direction, wherein said lining material turned inside out is pressed with its surface coated with resin against the inner surface of the pipe line, and c) maintaining the pressure by means of a pressure medium until the resin is cured.

Relative motions occur between the adjacent surfaces of the lining material as well as between the lining material and a retaining belt used with turning, respectively, during the motion of the flexible tubular lining material. Based on the relatively high coefficient of friction, hence great friction forces have to overcome which require a high pressure of the pressure medium, in order to maintain the motion of the lining material. To reduce the required pressure, however, it is also known from the U.S. Pat. No. 4,368,091 to spray the external side of the lining material with a strip additive to reduce the coefficient of friction. However, this manner of depositing strip additive is only possible if it is relatively fluid. But a fluid strip additive is largely pushed back between the friction surfaces pressed against each other with high pressure such that its sliding action is substantially impaired and the frictional forces are not substantially reduced. This problem especially takes place with pipes having a low diameter and in particular then, when such pipes have greater curvatures, which the lining material has to follow. Herein, the danger exists, that inappropriately great forces have to be applied or the redeveloping according to the known method is not enabled at all. These high forces are allowed to lead in that the method is greatly uneconomical or is no longer to realize in a safe quality. This is also deems with powder-type slip additives practically used, for example French chalk.

Hence, it is the object of the present invention to improve the well-known methods in such manner, that they also offer the possibility to redevelop pipes having a relatively low diameter and great curvatures up to 90° pipe bends without the application of inappropriately high forces for introducing the lining material into the pipe.

This object is solved by the method for lining a pipe or duct through a sealing internal lining having plastic coated flexible tube adhering to the inner wall by means of an adhesive, comprising the steps:

filling a metered amount of adhesive into the flexible tube in a uniform manner over the length of the flexible tube, depositing a slip additive layer onto the external side of the flexible tube, wherein the viscosity of the strip additive is sufficiently reduced by heating, introducing the flexible tube into the pipe, wherein one end of the flexible tube is secured to the rear end of the pipe or duct with respect to the moving direction, and the flexible tube is introduced by using turning inside out by means of the cooled strip additive having a sufficient high viscosity into the pipe or duct, and generating an internal pressure inside the introduced flexible tube, to press said tube against the inner wall of the pipe or duct until the adhesive is cured between the flexible tube or duct.

As a result of heating the strip additive during deposition onto the flexible tube and thus reducing its viscosity, the fexible tube can be uniformly wetted with the strip additive and having a sufficient thickness, whereas, when the portion of said flexible tube wetted with strip additive passes into the friction region, the strip additive is cooled again to the ambient temperature thus regaining its original higher viscosity such that it adheres more firmly to the flexible tube surface and encourages the sliding operation.

Preferably, a strip additive is used having a gel-like consistence at the ambient temperature. This affects a significantly greater reduction of the frictional force than strip additives, which are liquid at the ambient temperature as well.

Synthetic greases are advantageously suited as strip additives, which previously become liquid at temperatures approximately of 40° C. and enabling in this condition a uniform wetting of the flexible tube by drawing this flexible tube, for example, through a splashing of the respective heated strip additive.

At ambient temperature of (20° C.) the strip additive has suitably a viscosity within the range of 2 to 1300 Pas, preferably 3 to 100 Pas, and in the heated condition a viscosity within the range of 10 to 2000 mPas, wherein the temperature is respectively adjusted, preferably within the range of 40° C. to 120° C. to obtain a desired viscosity in this condition.

In the following, the invention is explained in more detail according to an embodiment shown in the figures, in which:

FIG. 6 shows the operation during completion of introduction;

FIG. 7 shows the curing operation of the adhesive; and

Figure 1:
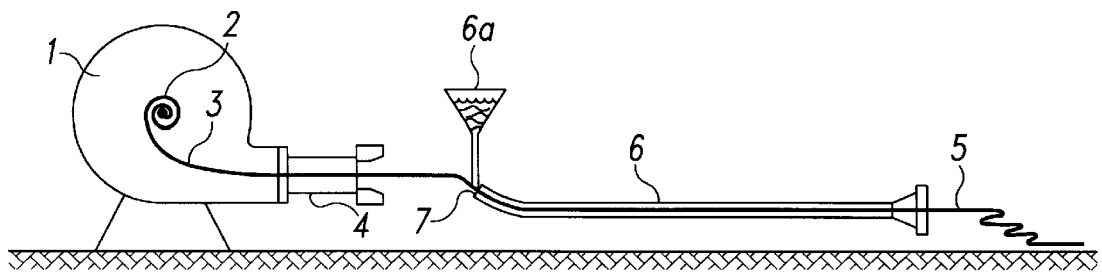
FIG. 1 shows a filling operation of adhesive into a flexible tube for example comprising a plastic coated fabric.
Figure 2:
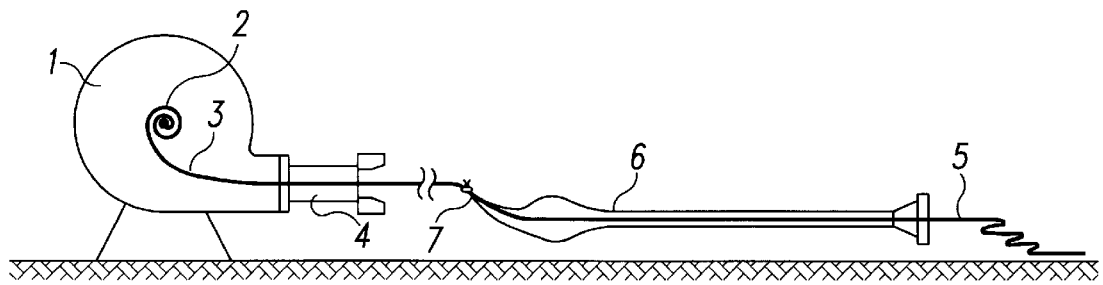
FIG. 2 shows the closing operation of the flexible tube at one end and the attaching operation with a drawing belt.

In FIG. 1 a rotary drum 1 is provided with a rotary shaft 2. One end of the retaining belt 3 is secured to the rotary shaft 2. The retaining belt 3 is led out of the rotary drum 1 through a flexible tube unit 4.

The retaining belt 3 is drawn through the flexible tube 6 to be lined which comprises a plastic coated fabric, for example, and protrudes therefrom at both sides.

With the arrangement shown in FIG. 1, at first an adhesive 6a is filled into the flexible tube 6 at the end facing to the rotary drum 1. After the filling operation is completed, this end is closed at the position 7. By coupling the flexible tube at the position 7 the retaining belt extending from the rotary drum to the position 7 beyond the position 7 becomes a guiding belt 5 now.

Figure 3:
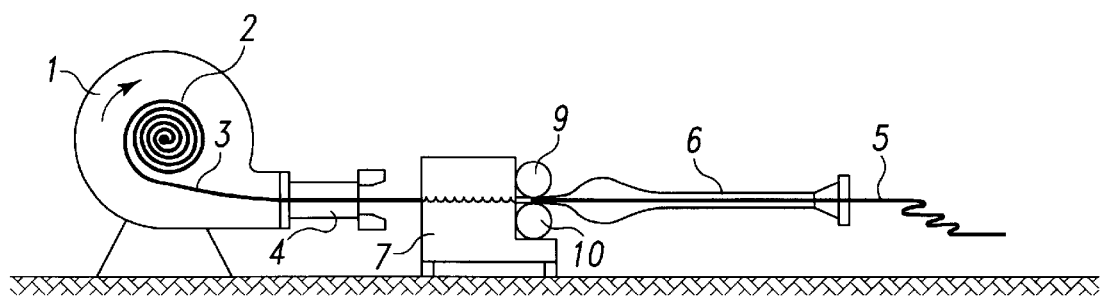
FIG. 3 shows the winding operation of the flexible tube filled with adhesive into a pressure drum.

As can be seen from FIG. 3, a device 8 for depositing a strip additive is then installed at the end of the flexible tube 6 facing to the rotary drum 1. Now, the rotary shaft 2 of the rotary drum 1 is rotated such that the retaining belt 3 is wound onto this drum, wherein the flexible tube 6 is drawn behind and is drawn through the device 8 shown in FIG. 8 in more detail. At the inlet of the device 8, there are two rolls 9 and 10, which therebetween the flexible tube is passed through and which mutual distance is adjustable. Above this distance the amount of the adhesive inside the flexible tube 6 can be metered, i.e. the thickness of the adhesive layer can be adjusted.

After the retaining belt 3, the flexible tube 6 filled with an adhesive and wetted with strip additive is also entirely wound onto the rotary shaft 2 of the rotary drum 1. The device 8 is subsequently removed.

Figure 4:
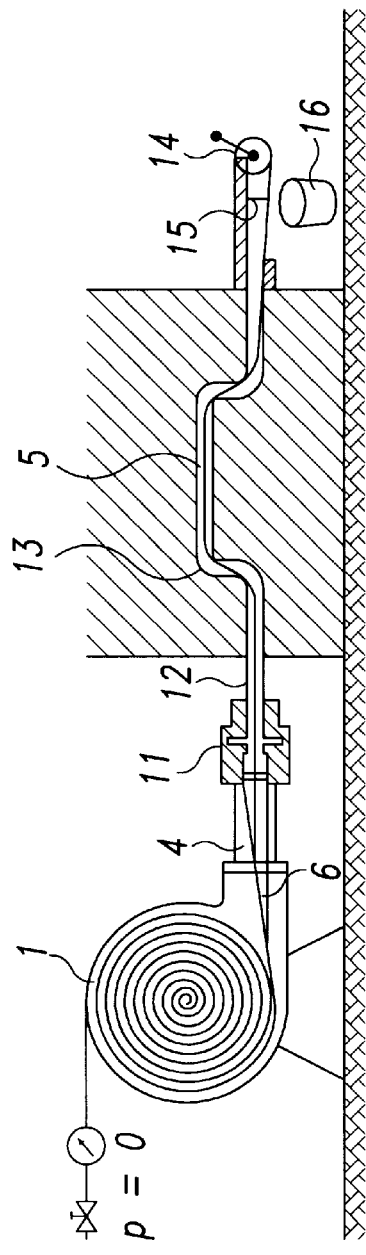
FIG. 4 shows the operation of coupling the flexible tube with the pipe to be lined.

Now, as FIG. 4 shows, a reversible head 11 is arranged at the free end of the flexible tube unit 4, to which the end of the flexible tube 6 being not wound is secured. The reversible head 11, in turn, is secured to the end of the pipe 12 to be lined, which faces to the rotary drum 1, with the pipe being also allowed to include knees and knee pipes, respectively. The portion of the guiding belt 5 being not received within the flexible tube 6 is drawn through the pipe 12 and secured to the other end of the pipe 12 on the rotary shaft of a winch 14.

Compressed air is now supplied to the rotary drum 1, such that therein a respective pressure is generated, which acts through the flexible tube unit 4 onto the closed front end of the flexible tube 6. Since this end is fastened by the reversible head 11, the flexible tube 6 is turned inside out when pressed into the pipe 12 by the pressure and is advanced therein. This movement is supported by the guide belt 5, which is wound by the winch 14 and applies a tensile force on the flexible tube 6 therewith. In front of the winch 14 is a stripper 15, which strips the adhesive from the guide belt 5 such that it is collected inside a container 16.

Figure 5:
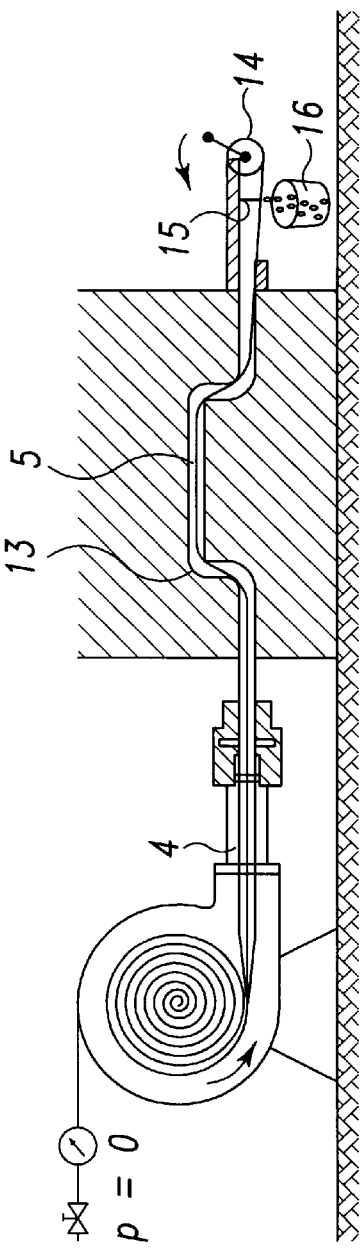
FIG. 5 shows the operation of introducing the flexible tube into the pipe.

FIG. 5 shows the condition during lining the pipe 12 with the flexible tube 6, which is unwound inside the rotary drum 1 according to its advance. The turned up portion of the flexible tube 6 with its plastic coated surface put against the inner wall of the pipe 12 and is pressed against this by the compressed air supplied by the rotary drum 1.

When the closed forward end of the flexible tube 6 is emerged at the side of the pipe 12 opposite to the rotary drum 1, as shown in FIG. 6, the guide belt 5 is cut off, and at the other end the flexible tube 6 is clamped off by means of a clamping device 17, such that the pressure inside the flexible tube 6 is maintained even if the rotary drum 1 is disengaged therefrom. Then, the flexible tube unit 4 is occluded with a blind flange 18 in pressure sealed manner. The clamping device 17 can be opened again without a pressure drop inside the flexible tube 6 and can be removed. Finally, a heated medium such as air or water is pressed under pressure through an inlet 19 into the flexible tube 6 such that its internal temperature is increased and curing of the adhesive between the outside of the flexible tube 6 and the inner wall of the pipe 12 is accelerated.

Figure 8:
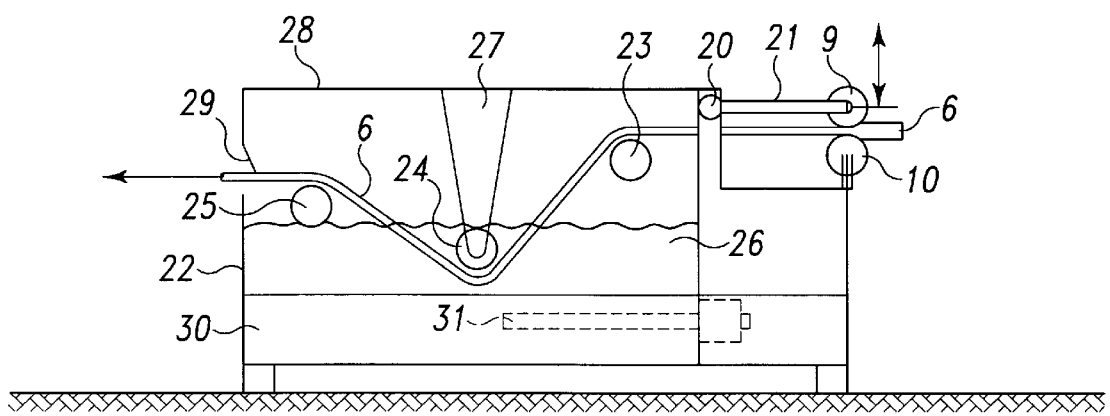
FIG. 8 shows a device for depositing a strip additive onto the flexible tube.

FIG. 8 includes a detailed illustration of the device 8 for depositing the strip additive onto the flexible tube 6. This is led into the device 8, at the right side, and is discharged therefrom, at the left side. Therewith, the flexible tube 6 at first passes between the two rolls 9 and 10, which mutual distance can be adjusted for example by a respective up and down movement of the roll 9 supported on the arm 21 being pivotably around the axis 20.

Then, the flexible tube 6 passes into a trough 22, which is filled in the lower region with a strip additive. Furthermore, inside the trough 22 there are three guide rolls 23, 24 and 25 for guiding the flexible tube 6 through a splashing 26 comprised of the strip additive. Therein, the center roll 24 below which the flexible tube 6 is led through, is disposed in a lower position than the two external rolls 23 and 25, such deep indeed that within the region of the roll 24 the flexible tube 6 is ensured to entirely immerse into the splashing 26. The roll 24 being supported on the arm 27, which in turn is secured to a removable cover 28 of the trough 22. Herewith, handling the device 8 is greatly simplified. When depositing the strip additive onto the flexible tube 6 has started prior to its winding in the rotary drum 1, the cover 28 is placed up such that an access in the interior of the through 22 is enabled. Then, the trough 6 is drawn through the trough 22, wherein it is supported on the two external rolls 23 and 25. The cover 28 is subsequently closed again such that the roll 24 secured thereon forces the flexible tube 6 below the surface of the splashing 26. Advantageously, the cover 28 is composed of a transparent material, hence the proper operation of strip additive wetting inside the device 8 can be monitored without any problems.

At the discharge side of the trough 22 is a stripping rail 29 adjustable in height, which determines the height of the outlet slit for the flexible tube 6 and hence the thickness of the strip additive layer thereon as well.

The strip additive, which is preferably composed of synthetic grease is to comprise a gel-like consistence at the ambient temperature, thus it effectively reduces the high friction, in particular during passing through pipe bends and knees of the pipe 12 between surfaces of the flexible tube 6 sliding upon each other as well as the flexible tube 6 and the draw belt 3, respectively, serving as retaining belt. The respective values of viscosity are within the range of 2 to 1300 Pas, preferably 10 to 150 Pas. On the other hand, liquid condition is required for the strip additive in order to uniformly wet the flexible tube 6 with the strip additive. The invention solves this problem in that the strip additive inside the trough 22 is heated to a temperature above the ambient temperature, wherein the degree of heating depends on the desired viscosity with the coating. Heating up to approximately 40° C. can previously be sufficient to decrease the viscosity in the desired extent to a value within the range of approximately 10 to 2000 mPas. Since wetting the flexible fabric tube 6 with strip additive is very thin and the duration time of the flexible tube 6 within the splashing 26 is very short, the strip additive cools to the ambient temperature within a short time after leaving the trough 22 and hence recovers the gel-like consistence. Thus the ability to reduce the frictional forces with introducing the flexible tube 6 into the pipe 12 is not impaired by the heating with wetting.

To ensure a possibly uniform heating of the strip additive splashing 26, the trough 22 is thermally coupled to a water bath 30 located below the trough 22. The water bath 30 is maintained to the desired temperature by means of a constant-temperature heating device 31 to adjust the temperature of the strip additive within the trough 22 to a desired value. In place of the water bath 30, an oil-bath, a heating plate or an infrared radiation heating or other heating sources may be used.

We claim:

1. A method for lining a pipe or duct through a sealing internal lining with a plastic coated flexible tube adhering to the inner wall by means of adhesive, comprising the steps:

filling a metered amount of adhesive into said flexible tube in uniform distribution over the length of the flexible tube, depositing a slip additive layer having a viscosity within the range of 2 to 1300 Pas at ambient temperature onto the outside of the flexible tube, wherein the viscosity of the slip additive is reduced by heating to a range between 10 to 2000 mPas, introducing said flexible tube into said pipe or duct, by securing one end of said flexible tube to the rear end of the pipe or duct with respect to the moving direction of said flexible tube, and turning said flexible tube inside out after the slip additive has cooled and its viscosity has increased, and;

generating an internal pressure inside said introduced flexible tube in order to press said flexible tube against he inner wall of the pipe or duct until the adhesive between said flexible tube and the inner wall of the pipe or duct is cured.

2. A method according to claim 1, wherein the slip additive has a gel-like consistence at ambient temperature.

3. A method according to claim 2, wherein the slip additive is a synthetic grease.

4. A method according to claim 1, wherein the slip additive has a temperature within the range of 30 to 120° C. in the heated condition.

5. A method according to claim 1, wherein the flexible tube is drawn through a splashing of heated slip additive.

6. A method according to claim 5, wherein said slip additive is heated within a water bath.

7. An apparatus for performing the method according to claim 1, in which a container receiving said slip additive is provided, in which rolls exist for guiding said flexible tube through the slip additive.

8. An apparatus according to claim 7, in which the container comprises a movable cover, which a roll is secured to such that, with placed cover, pressing said flexible tube into said strip additive.

9. An apparatus according to claim 8, in which the cover of the container is transparent.

10. An apparatus according to claim 7, in which the container comprises at least one heated side.

11. An apparatus according to claim 7, in which a pair of rolls are disposed at the container inlet, which said flexible tube passes therethrough, wherein the mutual distance of the rolls is adjustable.

12. An apparatus for lining a pipe or duct through a sealing internal lining with a plastic coated flexible tube adhering to the inner wall by means of adhesive, the apparatus comprising:

a distributor to deposit a metered amount of adhesive into said flexible tube in uniform distribution over the length of the flexible tube, a heater heating the slip additive layer and lowering its viscosity;

a container receiving the slip additive having rolls for guiding said flexible tube through said slip additive and further having an adjustable stripping means for the slip additive at the outlet of the container;

a fixture for positioning a pipe or duct, a moveable grip for securing one end of said flexible tube to the rear end of the pipe or duct with respect to the moving direction of said flexible tube, and to introduce the flexible tube into the pipe or duct by turning said flexible tube inside out within the pipe or duct after the slip additive has cooled, and a pressurizer to generate an internal pressure inside said introduced flexible tube in order to press said flexible tube against the inner wall of the pipe or duct until the adhesive between said flexible tube and the inner wall of the pipe or duct is cured.

13. The apparatus according to claim 12, wherein said heater is configured to heat the slip additive to a temperature within the range of 30° to 120° C.

14. The apparatus according to claim 12, wherein said heater comprises a water bath.

15. The apparatus according to claim 12, wherein said container further comprises a moveable cover, which a roll is secured to such that, with placed cover, pressing said flexible tube into said slip additive.

* * * * *